United States Patent [19]
Suzuki et al.

[11] Patent Number: 5,691,260
[45] Date of Patent: Nov. 25, 1997

[54] CUBIC SYSTEM BORON NITRIDE SINTERED BODY FOR A CUTTING TOOL

[75] Inventors: Masaharu Suzuki, Machida; Teruyoshi Tanase, Gifu-ken, both of Japan

[73] Assignees: Denki Kagaku Kogyo Kabushiki Kaisha; Mitsubishi Materials Corporation, both of Tokyo, Japan

[21] Appl. No.: 689,007

[22] Filed: Jul. 30, 1996

Related U.S. Application Data

[63] Continuation of Ser. No. 366,454, Dec. 30, 1994, abandoned.

[51] Int. Cl.⁶ .......................... C04B 35/5831; B24D 3/02
[52] U.S. Cl. ............................ 501/96; 51/307; 51/309
[58] Field of Search ................................ 501/96; 51/307, 51/309

[56] References Cited

U.S. PATENT DOCUMENTS

| | | | |
|---|---|---|---|
| 3,212,852 | 10/1965 | Bundy | 423/290 |
| 3,852,078 | 12/1974 | Wakatsuki et al. | 501/92 |
| 4,016,244 | 4/1977 | Susa et al. | 423/290 |
| 4,148,863 | 4/1979 | Farafontov et al. | 51/309 |
| 4,188,194 | 2/1980 | Corrigan | 51/307 |
| 4,201,757 | 5/1980 | Corrigan | 51/307 |
| 4,289,503 | 9/1981 | Corrigan | 51/307 |
| 4,673,414 | 6/1987 | Lavens et al. | 51/307 |
| 5,106,792 | 4/1992 | Corrigan | 501/96 |
| 5,194,071 | 3/1993 | Corrigan et al. | 51/293 |
| 5,320,988 | 6/1994 | Corrigan | 501/96 |
| 5,443,605 | 8/1995 | Suzuki et al. | 51/307 |
| 5,466,269 | 11/1995 | Corrigan et al. | 51/307 |

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A cubic system boron nitride sintered body for a cutting tool, which is a cubic system boron nitride sintered body having a purity of at least 99 wt % obtained by a direct conversion method, wherein the average size of primary crystal grains constructing the sintered body is at most 3.0 μm.

13 Claims, 1 Drawing Sheet

CUBIC SYSTEM BORON NITRIDE SINTERED BODY FOR A CUTTING TOOL

This application is a Continuation of application Ser. No. 08/366,454, filed on Dec. 30, 1994, now abandoned.

BACKGROUND OF THE INVENTION

1. Field of the Invention

The present invention relates to a cubic system boron nitride sintered body useful as a material for a cutting tool such as a drilling tool, particularly as a material for a tool for cutting cast iron, hard metal, hardened steel, tungsten carbide or the like. Further, the present invention relates to a cutting tool made of such a cubic system boron nitride sintered body.

2. Discussion of Background

Cubic system boron nitride (cBN) which is a high pressure phase of boron nitride, has high thermal conductivity and hardness next to diamond and has a characteristic such that it is not reactive with an iron group metal, which diamond does not have. Accordingly, its application as a material for a tool for cutting an iron group metal or a hard metal and tungsten carbide containing a substantial amount of an iron group metal such as cobalt, is being progressed.

For a cutting operation, there has been a trend for high efficiency and automation in recent years. The actual way of accomplishing the high efficiency is heavy cutting and high speed cutting. Under such severe cutting conditions, a heavy load is exerted to the tool, especially to the cutting edge of the tool. Accordingly, a material having high strength is required for the tool. On the other hand, for the purpose of automation, a material excellent in the abrasion resistance and having a long useful life is required for the tool which will not wear even when continuously used for a long period of time and which does not require frequent replacement of the tool.

However, a cBN sintered body tool which satisfies the two functions of "high strength" and "excellent wear resistance" simultaneously, particularly the one which is suitable for cutting a brittle but highly hard material which is difficult to cut, such as cast iron, hard metal, hardened steel, tungsten carbide or the like, has little been developed, for the following reasons.

(1) A conventional sintered body composed solely of cBN, can be prepared by sintering fine powder of cBN. Therefore, the hardness of the sintered body itself is very high. However, cBN powder is hardly sinterable, and therefore a product having a sufficient strength useful as a material for a cutting tool, has not been obtained.

(2) A conventional cBN sintered body for a tool has been a composite prepared by adding a binder such as a metal such as Al or Co, a carbide, nitride or oxide such as TiN, TiC or $Al_2O_3$, to cBN powders, followed by sintering, to obtain a sintered body having high strength. However, such a composite contains a binder having a lower hardness than cBN in the sintered body, and therefore the hardness of the sintered body tends to be low and the high hardness as the characteristic of cBN has not practically been utilized.

SUMMARY OF THE INVENTION

Under these circumstances, the present inventors have conducted various studies with an aim to develop a material for a cutting tool which is capable of simultaneously satisfying requirements for "high strength", "high toughness" and "excellent wear resistance" even for cutting a brittle but highly hard material which is difficult to cut, such as cast iron, hard metal, hardened steel, tungsten carbide or the like. As a result, they have found that the method for preparing the cBN sintered body, the purity and the fine structure are deeply connected with the performances of the cBN sintered body as will be described hereinafter. The present invention has been accomplished on the basis of this discovery.

Namely, it has been found that when a direct conversion method is used instead of the conventional sintering method using a binder, which has been commonly employed heretofore, it is possible to obtain highly hard polycrystalline sintered bodies composed solely of cBN, that among them, a cBN sintered body having a purity of at least 99 wt % has particularly high strength, that it is possible to obtain a sintered body having a uniform fine structure wherein the sizes of primary crystal grains of cBN constituting the sintered body are uniform, by properly selecting the conditions for its preparation, that the sizes of primary crystal grains of cBN are deeply related to the wearing of the sintered body, and that when the average size of the primary crystal grains is at most 3.0 µm, the sintered body is excellent in wear resistance, even when it is used for cutting a brittle but highly hard material which is difficult to cut, such as cast iron, hard metal, tungsten carbide or the like.

Thus, the present invention provides a cubic system boron nitride sintered body for a cutting tool, which is a cubic system boron nitride sintered body having a purity of at least 99 wt % obtained by a direct conversion method, wherein the average size of primary crystal grains constructing the sintered body is at most 3.0 µm, and a cutting tool made of such a cubic system boron nitride sintered body.

BRIEF DESCRIPTION OF THE DRAWING

In the accompanying drawing.

DETAILED DESCRIPTION OF THE PREFERRED EMBODIMENTS

Figure 1:
FIG. 1 is an electron microscopic photograph showing the structure of primary crystal grains of the cBN sintered body obtained in Example 1, by a dark field image (800 magnifications) of a transmission electron microscope.

Now, the present invention will be described in detail with reference to the preferred embodiments.

The direct conversion method in the present invention is a method for obtaining a cBN sintered body by a direct phase transformation between solids without using a catalyst or a binder. One example of such a method is disclosed in Japanese Examined Patent Publication No. 394/1988 (U.S. Pat. No. 4,188,194), and the sintered body can be obtained by treating pyrolytic boron nitride as one of low pressure phase boron nitrides, at a high temperature under a high pressure within a stable region of cBN. Here, the low pressure phase boron nitride is the one having a structure such that boron and nitrogen atoms are alternately bonded to form hexagonal network layers which are laminated. Specifically, it is made of a simple substance or a mixture of hexagonal system boron nitride (hBN), turbostratic-layered boron nitride (tBN) and rhombohedral boron nitride (rBN).

In the present invention, in order to obtain a cBN sintered body having the above-mentioned high purity and having the size of primary crystal grains controlled, it is necessary to strictly control the starting material, the reaction chamber for generating a high temperature and high pressure, and the retention temperature and time, which will be described hereinafter.

The reasons for employing a direct conversion method in the present invention are as follows. (1) In the method for the preparation wherein a catalyst or a binder is used, the catalyst or the binder will remain as impurities in the grains or at grain boundaries of primary crystal grains of the cBN sintered body, whereby it is hardly possible to obtain a sintered body having high hardness. (2) In the method for the preparation wherein a catalyst or a binder is used, the sizes of primary crystal grains of the resulting cBN sintered body will be always at least a few μm, while in the direct conversion method, the sizes of primary crystal grains can be changed to various levels by adjusting the conditions for the preparation.

In the present invention, the cBN sintered body has a purity of at least 99 wt %, preferably at least 99.9 wt %. If the purity is lower than the above range, the strength and hardness of the cBN sintered body tend to be low. For this purpose, it is necessary to take due care so that a component other than cBN, such as a part of the low pressure phase boron nitride as the starting material, will not remain unconverted, or impurities from e.g. the reaction chamber will not enter, to avoid formation of a sintered body having a cBN purity of less than 99 wt %, even when the direct conversion method is employed.

The amount of the low pressure phase boron nitride remaining as one of impurities, can be determined by using the ratio of the diffraction intensity of a specific diffraction of the low pressure phase boron nitride, such as $d_{002}$ (in the case of hBN and tBN) or $d_{003}$ (in the case of rBN), to the intensity of the specific diffraction of cBN, such as the (111) diffraction intensity, as measured by a usual powder X-ray diffraction method, and comparing the ratio with a calibration curve preliminarily prepared. The calibration curve can be prepared by using test samples prepared by mixing the low pressure phase boron nitride and cBN in predetermined various weight % and measuring the ratio of the $d_{002}$ or $d_{003}$ diffraction intensity of the low pressure phase boron nitride to the (111) diffraction intensity of cBN.

Further, the amounts of the impurities such as carbon and metals entering from e.g. the reaction chamber can be measured by common chemical analyses or fluorescent X-ray analyses.

In the present invention, the sizes of primary crystal grains constructing the cBN sintered body mean the sizes of cBN crystal grains constructing the polycrystalline sintered body, and such a size may also be referred to as the primary grain size of the sintered body.

The average size of primary crystal grains constructing the cBN sintered body can be measured, for example, by the following methods. In any measuring method, the analysis is directed to very fine portions, and accordingly it is advisable to carry out the measurement at a plurality of locations so that the entire structure of the sintered body can be uniformly examined.

(1) A thin fragment of the sintered body is observed by a transmission electron microscope, whereby an image is formed using only a certain specific diffraction to obtain a dark field image having a contrast corresponding to the sizes of primary crystal grains, and the average grain size is determined by analyzing the image of the photograph of the dark field image (containing the image of a plurality of primary crystal grains).

(2) The sintered body is fractured, and the fracture surface along the grain boundary is directly observed by a scanning atomic repulsion force microscope, and the image of the obtained photograph is analyzed to determine the average grain size.

(3) The surface of the sintered body is subjected to etching with heat melt sodium carbonate to selectively etching the grain boundary portions to roughen the surface, and the roughness is measured by a surface roughness meter to determine the average grain size.

In the present invention, the average size of primary crystal grains constructing the cBN sintered body is defined to be at most 3.0 μm, preferably at most 2.0 μm, more preferably at most 1.0 μm. If the average size of the primary grains exceeds 3.0 μm, the toughness of the sintered body tends to be low, and when it is used as a cutting tool, the wear resistance tends to be very poor. The lower limit for the average size of primary crystal grains is not particularly limited, but may, for example, be 0.1 μm.

The cBN sintered body to be used in the present invention can be prepared, for example, as follows. Namely, basically, it can be obtained by treating pyrolytic boron nitride at a high temperature under a high pressure within a region where cBN is stable, as disclosed, for example, in Japanese Examined Patent Publication No. 394/1988 (U.S. Pat. No. 4,188,194). In the present invention, such treatment is conducted while strictly controlling the starting material, the reaction chamber for generating the high temperature and high pressure, and the retention temperature and time, as follows.

Firstly, as the starting material, it is required to employ a low pressure phase boron nitride having a high purity, such as pyrolytic boron nitride, and its purity is preferably at least 99.9 wt %. Further, in order to avoid contamination during the high temperature high pressure treatment process, a material of high purity which is not reactive with cBN, is employed as the material for the reaction chamber. Specifically, the reaction chamber preferably has a structure such that high purity carbon of a semiconductor grade having a purity of at least 99.9 wt % is used as a heater for heating, a sleeve made of a shaped product of NaCl powder of a high purity, is disposed in the heater, and a low pressure phase boron nitride starting material (pyrolytic boron nitride) wrapped with a tantalum (Ta) foil is inserted in the sleeve. With such a structure, Ta serves as a getter which absorbs impurities, whereby diffusion of impurities from the carbon heater or from the exterior thereof, can be prevented by the Ta foil. Further, since NaCl has a low electrical conductivity, by disposing such NaCl in the form of a sleeve between Ta and carbon having good electrical conductivity, constant heating can be carried out without contacting Ta and carbon.

The temperature, the pressure and the time for maintaining the high temperature and high pressure are very much influential over the purity of the resulting sintered body and the sizes of the primary crystal grains. To obtain a product wherein the average size of primary crystal grains is at most 3.0 μm, it is necessary to control the temperature within a range of from 1900° to 2100° C. under a pressure at which cBN is thermodynamically stable. If the temperature is less than 1900° C., the low pressure phase boron nitride as a starting material will not completely be converted to cBN, whereby it tends to be difficult to obtain a sintered body having a purity of at least 99 wt %. On the other hand, if the temperature exceeds 2100° C., the grain growth is accelerated, whereby the average size of primary crystal grains tends to exceed 3.0 μm.

Here, "a pressure at which cBN is thermodynamically stable" is a pressure to be read from e.g. The Journal of Chemical Physics, vol. 63, No. 9, 1 Nov. 1975, p. 3812–3820, particularly from the phase diagram shown in FIG. 3 at p. 3815. Specifically, in the case of the direct conversion method at a temperature of from 1900° to 2100° C. as in the present invention, such a pressure is at least 6.5 GPa.

The retention time under the above conditions is preferably at most 120 minutes. If it exceeds 120 minutes, sintering of the formed primary crystal grains of at most 3.0 μm tends to proceed to cause grain growth, whereby the sizes of the primary crystal grains tend to be large.

U.S. Pat. No. 4,016,244 discloses a synthesis of a cubic system boron nitride sintered body which comprises adding at least 3 wt % of water to graphitic hexagonal boron nitride and sintering it at a temperature of at least 600° C. under at least 50 kbar. However, it is not only silent about a direct conversion method where no catalyst is employed as in the present invention but also discloses nothing about a cubic system boron nitride sintered body having a purity of at least 99 wt % wherein the average size of primary crystal grains is at most 3.0 μm.

Further, Japanese Unexamined Patent Publication No. 72768/1994 (U.S. patent application Ser. No. 08/253,196 now, received Notice of Allowance) discloses a method for preparing a cubic system boron nitride sintered body of the present invention, but the objective product is "abrasive grains" as opposed to "cutting tools" of the present invention.

When the cBN sintered body of the present invention is used as a material for a cutting tool, the resulting cutting tool will be suitable for cutting e.g. cast iron, hard metal, hardened steel or tungsten carbide for the following reason.

In a case of cutting a metal with a hardness which is not so high, the difference in hardness between the tool and the material to be cut is large, and the cutting edge of the tool readily enters into the material to be cut, and the force exerted to the tool itself will not be so high even in the intermittent cutting operation. Whereas, the cast iron, hard metal or hardened steel is highly hard though brittle, whereby a large shear force will be abruptly exerted to the cutting edge of the tool at the time of the cutting operation. However, in the polycrystalline cBN sintered body having a purity of at least 99 wt % obtained by a direct conversion method as in the present invention, the cBN particles are firmly bonded to one another, and little impurities are present in the grain boundaries so that the strength is high, and yet the average size of the primary crystal grains is as small as at most 3.0 μm, and it has a homogeneous fine structure, whereby propagation of cracks tends to hardly occur and the toughness is high. For these reasons, the cutting operation with a long useful life is possible even when the material to be cut is of high hardness. Further, when the cBN sintered body of the present invention is used as a cutting tool, the wear rate of the cutting edge is small, and the cutting edge has a long useful life for the following reason. Namely, the wear of the cutting edge during the cutting operation of cast iron, hard alloy, hardened steel, tungsten carbide or the like, is believed to result from falling off of primary crystal particles due to an abrupt shear force exerted to the cutting edge. However, with the cBN sintered body of the present invention, the purity is high, and no substantial impurities are present at the grain boundaries, whereby the bond strength of primary crystal particles to one another is high. Accordingly, falling off of the grains is less likely to occur. Since the average size of primary crystal grains constructing the sintered body is as small as at most 3.0 μm, even when such falling off takes place, the amount of the grains which fall off is small, so that the wear rate is small, and the useful life is long.

Now, the present invention will be described in further detail with reference to Examples and Comparative Examples. However, it should be understood that the present invention is by no means restricted by such specific Examples.

EXAMPLES 1 to 4, and COMPARATIVE EXAMPLES 1 to 6

Using commercially available pyrolytic boron nitride as the starting material and carbon having a purity of 99.9 wt % as the heater for heating and disposing a sleeve made of packed NaCl powder having a purity of at least 99.9 wt % in the heater, the starting material was wrapped by a tantalum foil, then charged to a flat belt type ultra high pressure high temperature-generating apparatus and treated at a various temperature of from 1870° to 2200° C. under a pressure of 7.7 GPa for 100 minutes, to obtain a cBN sintered body by a direct conversion method.

The obtained sintered body was analyzed by a powder X-ray diffraction apparatus (manufactured by Rikagaku Denki K. K.) to measure the weight % of the low pressure phase boron nitride and cBN present in the sintered body under a condition that the step scanning speed with Cu-Kα2θ was 0.01 degree/min. The measurement was carried out by comparing the ratio of the intensity of the (002) diffraction of the low pressure phase boron nitride to the intensity of the (111) diffraction of cBN, with a calibration curve preliminarily prepared. Further, a part of the sintered body was melted with sodium carbonate and chemically analyzed to determine the amounts of metal impurities contained in the sintered body. These analytical values were put together to determine the cBN purity of the sintered body. The results are shown in Table 1.

On the other hand, a part of the sintered body was cut into a thin fragment and inspected by a transmission electron microscope, so that an image is formed by using only a part of the (111) diffraction to obtain a dark field image having a contrast corresponding to the sizes of primary crystal grains. The obtained photograph of the dark field image (including the image of a plurality of primary crystal grains) was analyzed by an image analyzing apparatus ("LA555", tradename, manufactured by Pias K. K.) to determine the average size of primary crystal grains constructing the sintered body. The measurement was carried out by optionally selecting fields at 10 locations so that the entire sintered body can be grasped on the average. The results are shown in Table 1. Further, FIG. 1 shows an electron microscopic photograph of the dark field image (magnification: 8000 times) by a transmission electron microscope showing the structure of the primary crystal grains constructing the cBN sintered body obtained in Example 1.

Then, from the cBN sintered body obtained as described above, a chip blank for a tool was cut out by a diamond grinder. This chip blank was mechanically clamped by a cutting tool holder to obtain a tool for a cutting test, and a cutting test was carried out under the following conditions using cast iron and tungsten carbide as the materials to be cut. After the cutting test, defects of the cutting edge of the tool and the width of flank wear were determined. The results are shown in Table 1.

In the Case of Cast Iron

Material to be cut: FC25

Shape of chip: TNGN332

Cutting oil: Yushiroken HDE30 (diluted 30 times)

Machine used: Hitachi NK25S-1100

Cutting speed: V=700 m/min

Feeding: f=0.1 mm/rev

Cutting depth: d=0.1 mm

Cutting time: 60 min

In the Case of Tungsten Carbide

Material to be cut: WC=16% Co alloy (ERA84.5)
Shape of chip: TNGN332
Cutting oil: Yushiroken HDE30 (diluted 30 times)
Machine used: Hitachi NK25S-1100
Cutting speed: V=20 m/min
Feeding: f=0.2 mm/rev
Cutting depth: d=0.5 mm
Cutting time: 20 min

COMPARATIVE EXAMPLE 7

Using a commercially available cBN polycrystalline sintered body containing a ceramics binder, the cutting test was conducted under the same conditions as in Example 1, and defects of the cutting edge of the tool and the width of the flank wear after the test were determined. The results are shown in Table 1.

COMPARATIVE EXAMPLE 8

Using a commercially available cBN polycrystalline sintered body containing a metal binder, the cutting test was conducted under the same conditions as in Example 3, and defects of the cutting edge of the tool and the width of flank wear after the test were determined. The results are shown in Table 1.

prepared by a direct conversion method, wherein the average size of primary crystal grains constructing the sintered body is 0.1 μm to 3.0 μm, said purity is the purity determined by X-ray diffraction, and chemical analyses or fluorescence X-ray analyses, and a chip blank cut from said sintered body has a wear width of at most 0.205 mm without chipping, cracking or breaking, after a cutting test using FC25 cast iron, TNGN332 chip shape, a cutting speed of 700 m/min, a feeding of 0.1 mm/rev, a cutting depth of 0.1 mm and a cutting time of 60 min.

2. The cubic system boron nitride sintered body for a cutting tool according to claim 1, wherein the average size of the primary crystal grains is at most 0.1 μm to 2.0 μm.

3. The cubic system boron nitride sintered body for a cutting tool according to claim 2, wherein the average size of the primary crystal grains is at most 1.0 μm to 1.0 μm.

4. The cubic system boron nitride sintered body for a cutting tool according to claim 3, which is a cubic system boron nitride sintered body having a purity of at least 99.9 wt %.

5. The cubic system boron nitride sintered body for a cutting tool according to claim 1, wherein the cubic system boron nitride sintered body is the one sintered in such a manner that pyrolytic boron nitride is wrapped with a tantalum (Ta) foil and maintained at a temperature of from

TABLE 1

| | Temp. for synthesis (°C.) | Purity of the sintered body (%) | Average particle size of primary crystal particles (μm) | Material to be cut | Width of flank wear | Defects in the cutting edge |
| --- | --- | --- | --- | --- | --- | --- |
| Example 1 | 1980 | 99.9 | 0.8 | FC25 | 0.200 | Nil |
| Example 2 | 2070 | 99.0 | 2.0 | FC25 | 0.205 | Nil |
| Comparative Example 1 | 2200 | 99.8 | 10.6 | FC25 | 0.300 | Nil |
| Comparative Example 2 | 2110 | 99.8 | 5.0 | FC25 | 0.314 | Cracks and chipping |
| Comparative Example 3 | 1870 | 97.0 | 0.4 | FC25 | — | Broken upon expiration of 5 minutes during the test |
| Example 3 | 1980 | 99.9 | 0.8 | WC-16% Co | 0.259 | Nil |
| Example 4 | 2070 | 99.0 | 2.0 | WC-16% Co | 0.262 | Nil |
| Comparative Example 4 | 2200 | 99.8 | 10.6 | WC-16% Co | 0.335 | Nil |
| Comparative Example 5 | 2110 | 99.8 | 5.0 | WC-16% Co | 0.303 | Chipping partly observed |
| Comparative Example 6 | 1870 | 97.0 | 0.4 | WC-16% Co | — | Broken upon expiration of 13 minutes during the test |
| Comparative Example 7 | — | 60 | 3 | FC25 | 0.650 | Nil |
| Comparative Example 8 | — | 85 | 8 | WC-16% Co | 0.454 | Chipping partly observed |

As described in the foregoing, the cBN sintered body of the present invention has adequate strength useful for cutting a highly hard material to be cut, such as cast iron, hard metal or hardened steel, and it is possible to realize a remarkably long useful life for a cutting operation as compared with conventional materials for cutting tools.

What is claimed is:

1. A sintered body, comprising a cubic system boron nitride sintered body having a purity of at least 99 wt %

1,900° to 2,100° C. for at most 120 minutes under a pressure at which cBN is thermodynamically stable.

6. The cubic system boron nitride sintered body for a cutting tool according to claim 5, wherein the cubic system boron nitride sintered body is sintered at a temperature of from 1980° to 2070° C.

7. A cutting tool comprising:
a holder, and
a cubic system boron nitride sintered body;

wherein said cubic system boron nitride sintered body has a purity of at least 99 wt % obtained by a direct conversion method, wherein the average size of primary crystal grains constructing the sintered body is 0.1 µm to 3.0 µm, and wherein said purity is the purity determined by X-ray diffraction, and chemical analyses or fluorescence X-ray analysis, and a chip cut from said sintered body has a wear width of at most 0.205 mm without chipping, cracking or breaking, after a cutting test using FC25 cast iron, TNGN332 chip shape, a cutting speed of 700 m/min, a feed of 0.1 mm/rev, a cutting depth of 0.1 mm and a cutting time of 60 min.

8. The cutting tool of claim 7, wherein the average size of the primary crystal gains is at most 2.0 µm.

9. The cutting tool of claim 8, wherein the average size of the primary crystal grains is at most 1.0 µm.

10. The cutting tool of claim 9, which is a cubic system boron nitride sintered body having a purity of at least 99.9 wt %.

11. The cutting tool of claim 7, wherein the cubic system boron nitride sintered body is the one sintered in such a manner that pyrolytic boron nitride is wrapped with a tantalum (Ta) foil and maintained at a temperature of from 1,900° to 2,100° C. for at most 120 minutes under a pressure at which cBN is thermodynamically stable.

12. The cutting tool of claim 11, wherein said temperature is from 1980°–2070° C.

13. The cubic system boron nitride sintered body for a cutting tool according to claim 1, wherein said sintered body is prepared by sintering pyrolytic boron nitride.

* * * * *